(12) United States Patent
Steele

(10) Patent No.: US 8,655,547 B1
(45) Date of Patent: Feb. 18, 2014

(54) MOTION-ACTIVATED RESPONSE SYSTEM

(76) Inventor: Joseph Lo'Vel Steele, Philadelphia, PA (US)

( * ) Notice: Subject to any disclaimer, the term of this patent is extended or adjusted under 35 U.S.C. 154(b) by 178 days.

(21) Appl. No.: 13/506,205

(22) Filed: Apr. 4, 2012

Related U.S. Application Data

(60) Provisional application No. 61/531,216, filed on Sep. 6, 2011.

(51) Int. Cl.
*G06F 7/00* (2006.01)
*G05D 1/00* (2006.01)

(52) U.S. Cl.
USPC .............................................. 701/36; 701/49

(58) Field of Classification Search
USPC .............. 701/49; 240/425.5, 426.1, 429, 430, 240/435
See application file for complete search history.

(56) References Cited

U.S. PATENT DOCUMENTS

| | | | | |
|---|---|---|---|---|
| 7,966,109 | B2 * | 6/2011 | Desjardins | 701/33.4 |
| 2006/0139159 | A1 * | 6/2006 | Lee et al. | 340/457 |
| 2011/0267186 | A1 * | 11/2011 | Rao et al. | 340/449 |
| 2011/0285524 | A1 * | 11/2011 | Qian et al. | 340/457 |
| 2012/0232749 | A1 * | 9/2012 | Schoenberg et al. | 701/36 |
| 2013/0194089 | A1 * | 8/2013 | Estrada | 340/457.1 |

* cited by examiner

*Primary Examiner* — Ian Jen

(57) ABSTRACT

One embodiment is a safety device for children and pets who is about to be left alone in a vehicle with engine off and doors close. With a control box (80) that transmit a signal from the temperature sensor (81) and motion sensors (82), (82a). This control box (80) is made with a mother board not seen and a reserve power backup unit (96) which is always charged by the automobile's (70) electrical system. In addition it has a voice box (85) that will say EMERGENCY, EMERGENCY through the speakers (86). It's all power by the car's 12-volt batter (89a). Other embodiment are described and shown.

8 Claims, 5 Drawing Sheets

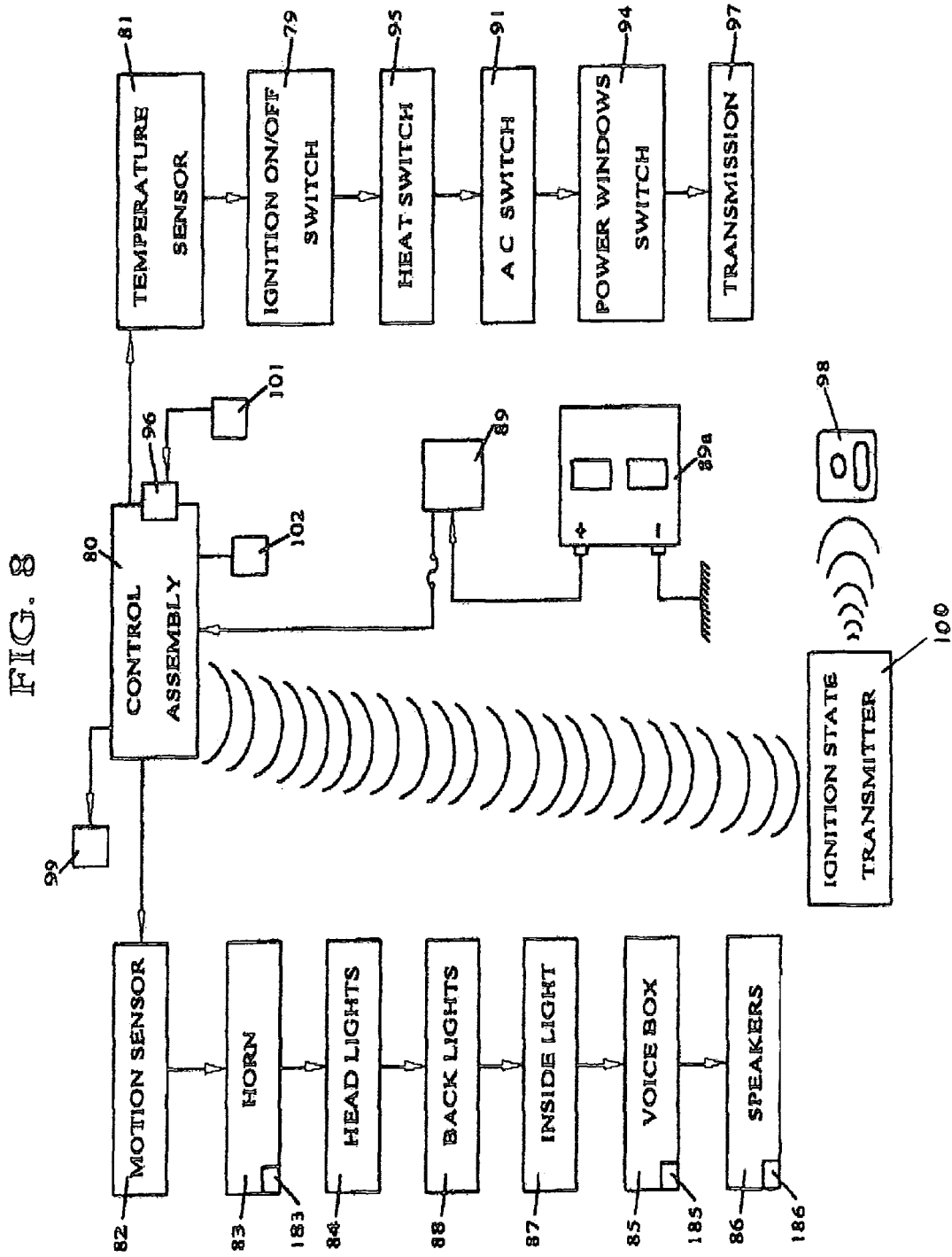

MOTION-ACTIVATED RESPONSE SYSTEM

CROSS-REFERENCE TO RELATED APPLICATIONS

This present application claims the priority benefit of U.S. Provisional Patent Application Ser. No. 61/531,216 filed Sep. 6, 2011, which is hereby incorporated hereby reference in its entirety.

BACKGROUND OF THE INVENTION

The present invention relates to a safety device which alerts drivers or passengers who are about to leave a child or pet alone in a vehicle. When the engine is shut off and the doors are closed, motion-detecting sensors and/or dangerous-temperature sensors in the vehicle activate the horn, the car's lights, and a recorded warning, as well as the heat regulating system, i.e the heater or air conditioner.

News reports and articles tell us about children and pets who were left alone in the family vehicle. Youngsters and family animals are defenseless in this situation, and the present invention avoids putting precious lives at risk. One system for preventing children from becoming inadvertently locked within a vehicle is described in U.S. Pat. No. 5,793,291. The system utilizes a motion detector to detect the presence of a child or pet within a locked vehicle.

Another system for preventing children from becoming inadvertently locked within a vehicle is described in U.S. Pat. No. 6,104,293. It is an objective of that invention to provide a system that warns when an unattended individual child has been left in an infant seat under dangerous conditions.

Other patents show various car seats which have detector for determining if the seat is occupied and to activate an alarm.

SUMMARY OF THE INVENTION

The present invention provides an apparatus for warning when a child or pet has been left in a turned-off vehicle. This system accomplishes both of the ends described in U.S. Pat. Nos. 5,793,291 and 6,104,293, but does not require the use of a specially-designed infant seat. This invention can work with unattended individuals whether they are children, infants, disabled persons or pets. The apparatus includes one or more motion sensors that detect any movement by an individual within the car who cannot let himself out. The system activates an alarm horn, a blinking light inside the car, headlights which will flash, and a warning voice which will say "EMERGENCY, EMERGENCY" for 1 minute. If no one shows up to operate the controls of the vehicle after a selected interval, for example one minute, during the absence of the driver, and if there is a buildup of dangerous heat or dangerous cold within the turned-off vehicle, the system will start the engine. If the car was left in gear, before starting the engine, the system will activate the parking brake and cause the transmission to shift the car into neutral. Depending on a signal from the temperature indicator, the system will activate the car's temperature controller. The air conditioner will be activated if the inside of the car is dangerously hot, and will stay on, but if the temperature does not come down within a predetermined period, the system will open the power windows. On the other hand, if the temperature is dangerously cold, the heater will be activated. Preferably, the temperature indicator will activate the air conditioner immediately, but will delay activating the heater for several minutes.

If the car is equipped with a monitored navigation system, the system of the invention may notify the monitor to advise 911 or to advise security personnel when the motion detector detects motion in the car when the car is parked unattended. This aspect of the invention will be activated when the car is locked and motion is detected within the car, as a theft-prevention system. If the driver of the car has a cell phone, the driver may enter the cell phone number into the system so that the system is programmed to send a message to the cell phone when motion is detected in the unattended vehicle, and/or when the temperature sensor detects dangerous temperatures in the car.

BRIEF DESCRIPTION OF THE DRAWINGS

FIG. 8 is a block diagram showing the wired and wireless connections within the system.

DETAILED DESCRIPTION OF THE PREFERRED EMBODIMENTS

The present invention will hereinafter be described in conjunction with the drawings in which like numerals denote like elements.

Figure 1:
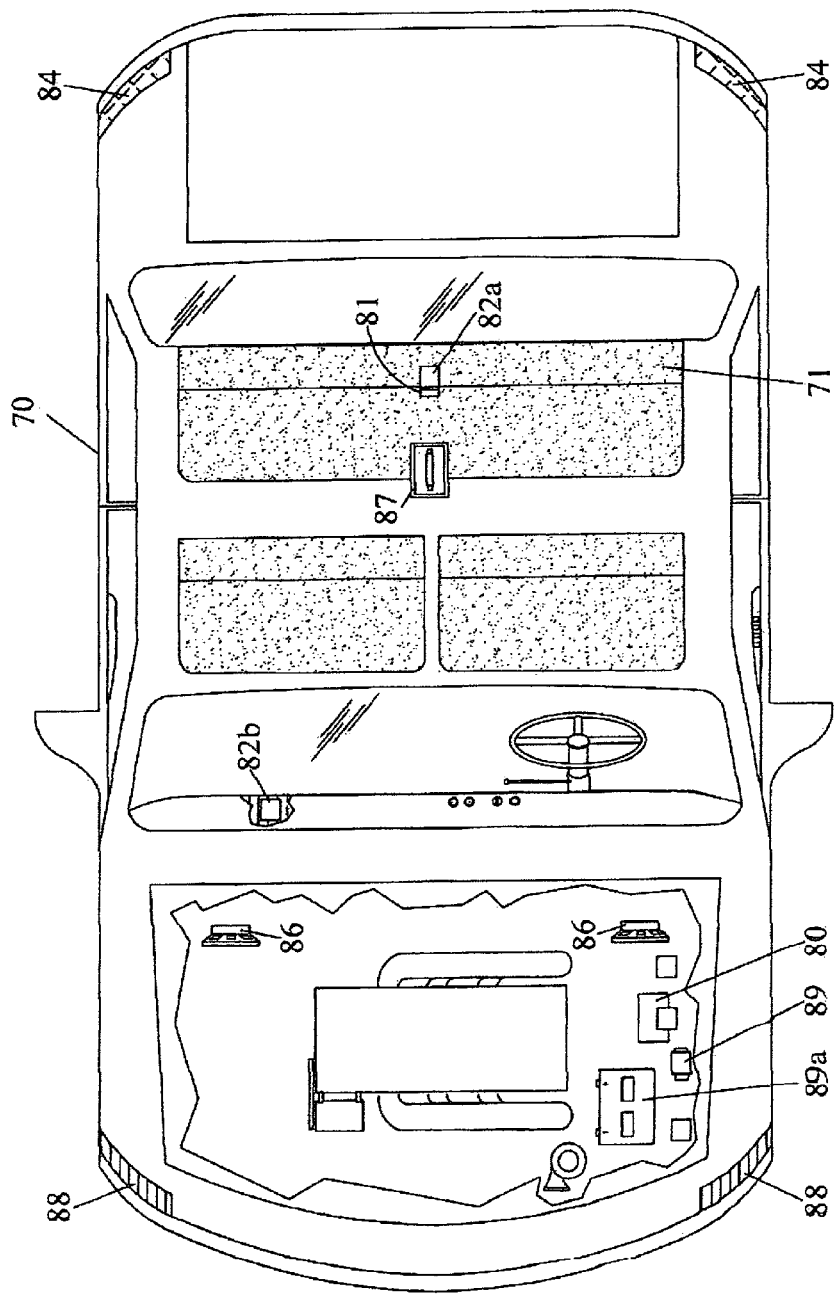
FIG. 1 is a diagrammatic plan view of a car with portions broken away to show the location of components in a system made in accordance with the invention.
Figure 2:
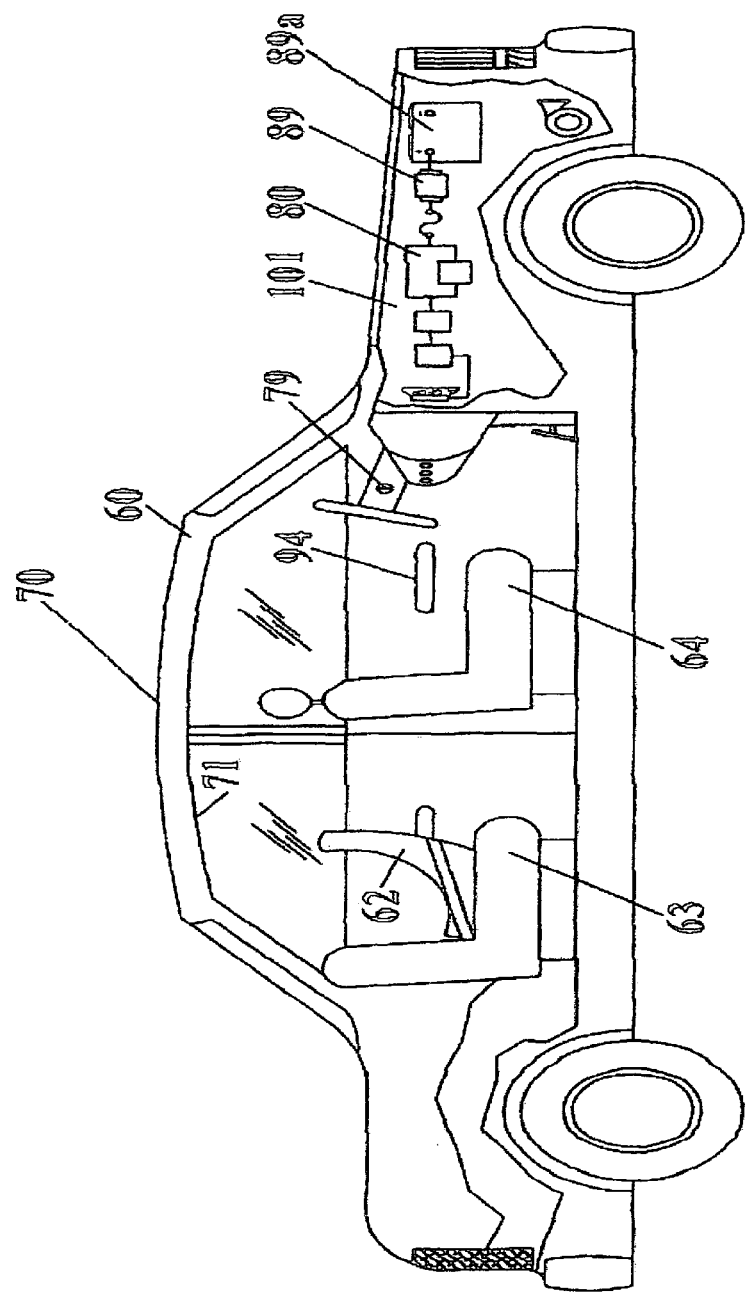
FIG. 2 is a diagrammatic side view of a car with portions broken away to show an infant car seat and the location of components in a system made in accordance with the invention.

In FIGS. 1, 2 and 8, an automobile 70 has a temperature sensor 81 and a motion sensor 82a which are fastened into place by screws in the back ceiling 71 above an infant car seat 62 on the back seat 63 of the automobile 70. These elements are connected into a control assembly 80 in the engine compartment powered by connections 89 attached to a 12-volt battery 89a in a conventional manner. Optionally, a second motion sensor 82b is positioned in the front compartment of the automobile 70 to cover areas in the car which are not covered by the sensor 82a.

Figure 3:
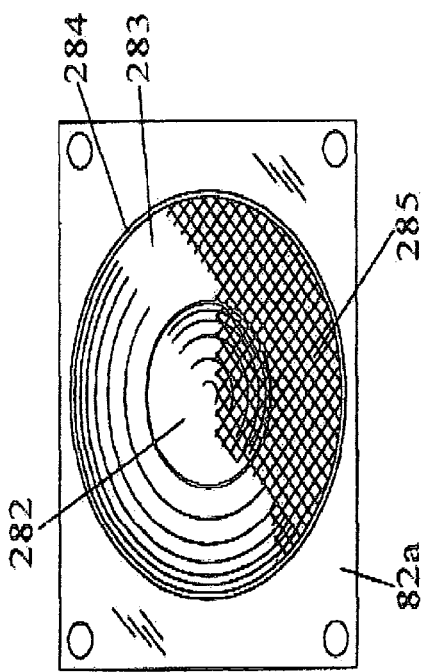
FIG. 3 is face view of a motion-sensing housing which may be used in the system of the invention, showing a motion detector element enclosed in circular chamber having a transparent protective cover. For illustrative purposes, the upper half of the cover is broken away to expose the detector element.
Figure 4:
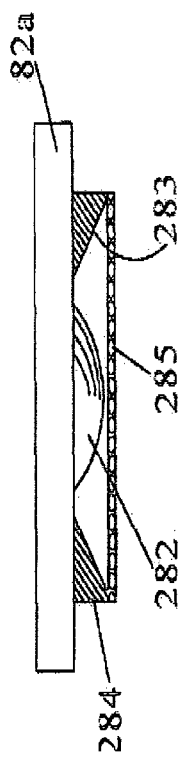
FIG. 4 is a plan view of the housing with the upper half of the chamber broken away.
Figure 7:
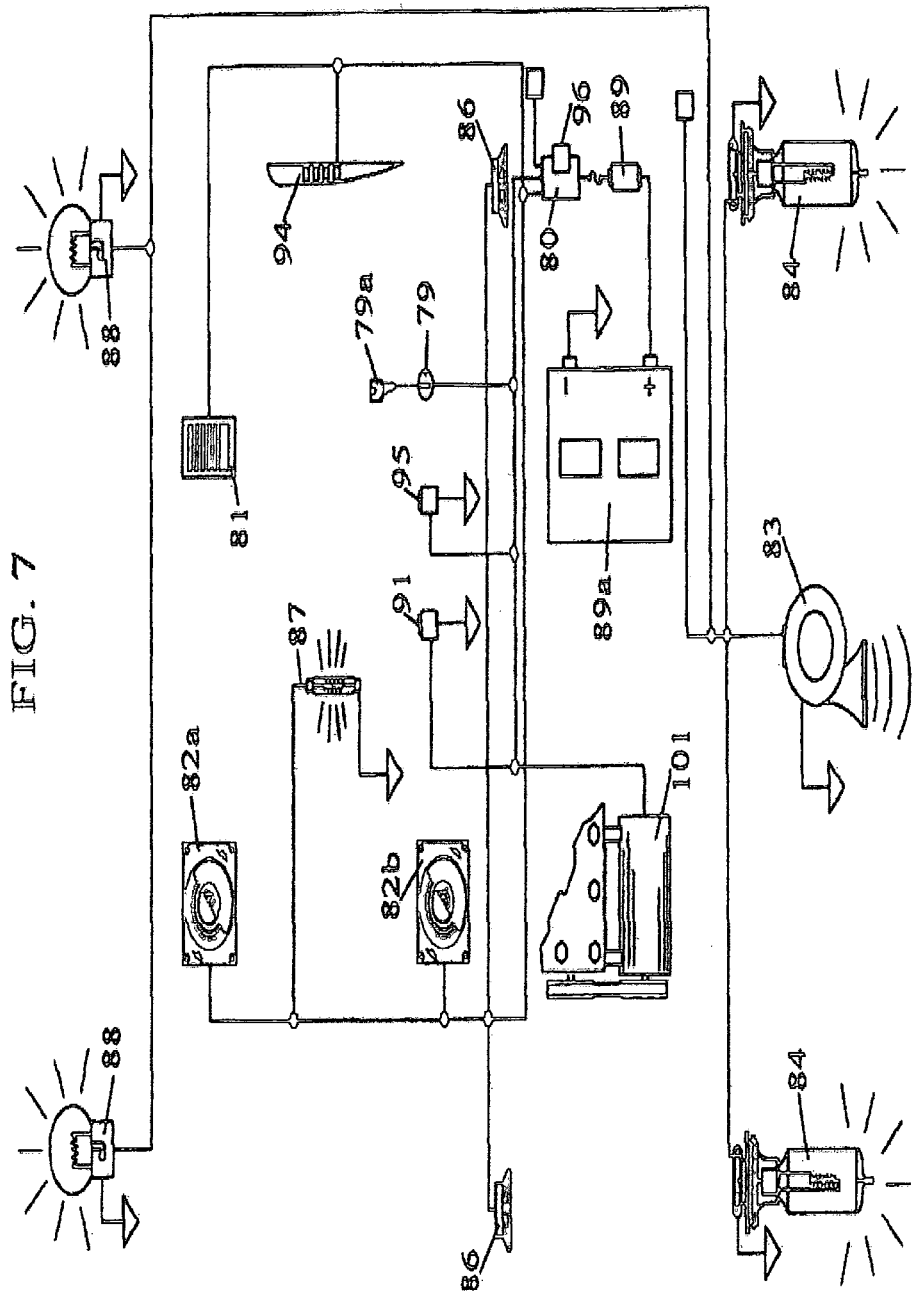
FIG. 7 is a diagram showing the power connection to the several components of the system.

As shown in FIGS. 3 and 4, the illustrated motion detector 82a has a central sensing element 282 centered within a generally conical or parabolic reflector 283 within a hollow cylindrical casing 284. The casing is protected by a transparent mesh cover 285. The elements 82a and 82b are operable to detect motion within the vehicle and generate a motion signal. Other motion detectors are available which detect any motion of the vehicle, for example when the parked vehicle is bumped or is subject to an attempted forced entry, for example when the parked vehicle is bumped or is subject to an attempted forced entry. Such motion detectors may be included in the system when the system is designed as a theft-prevention device.

Figure 5:
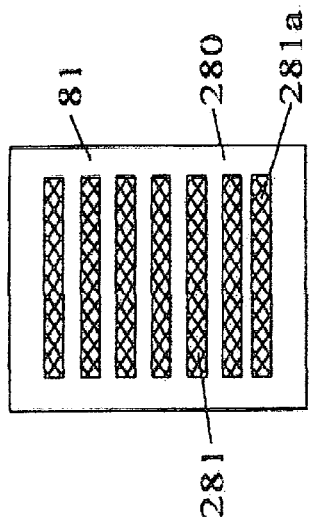
FIG. 5 is a face view of a temperature-sensing thermostat which may be used in the system.
Figure 6:
FIG. 6 is a plan view of the thermostat.

The temperature sensor 81 always detects an dangerous temperature, either due to a buildup of heat or cold in the automobile 70. However, the temperature sensor will not normally activate the system unless the motion sensors 82a and/or 82b detect the presence movement within the automobile 70. When the system is provided with a theft-detection mode described hereinafter, the temperature sensor is inactivated when the theft-detection mode is selected. When the theft-prevention mode of the system is activated, the system provides audible warnings when it detects motion either within the vehicle or by the vehicle itself. In the illustrated embodiment, as shown in FIGS. 1, 5 and 6, the temperature sensor is mounted adjacent the motion detector 82a and has a generally rectangular casing 280 housing temperature-sensing controls (not shown) similar to the controls of a household wall thermostat. The casing 280 has slots 281 in its face to permit the internal controls to "read" the temperature within the automobile and generate a temperature signal when the temperature is dangerously low or dangerously high.

When the motion sensors 82a and/or 82b detect movement within a turned-off vehicle 70, and at the same time when the temperature sensor 81 detects a buildup of dangerous heat or cold, the motion sensors 82a and/or 82b activate the control assembly 80. When the control assembly 80 receives a temperature signal or a motion signal, it is activated using a programmed general purpose processor, application specific processors, firmware and discrete components or combinations thereof. In the illustrated embodiment, the control assembly 80 is connected to the battery 89a of the electrical system of the automobile 70. A battery junction box 89 preferably includes an electrical connector providing a power connection to the supply power of the control box 80 which enables the control assembly 80 to activate the system in response to motion signals from the motion sensor 82a and/or 82b. The control box is connected to the ignition switch 79 so that if the ignition switch is off and an individual person or pet is inside the vehicle 70, and if the temperature inside builds up dangerous heat or cold and a temperature signal is generated, the control assembly 80 will be activated to sound the horn 83, activate the headlights 84, the inside lights 87 and the backup lights 88, all of which will flash.

To insure effective operation of the heater and the air conditioner, when either switch 91 or 95 is activated, the engine of the automobile 70 is started. If the car was left in gear, before starting the engine, a controller 99 connected to the transmission 97 will activate the parking brake and cause the transmission 97 to shift the car into neutral.

The control assembly also activates a voice box 85 (see FIG. 8) which provides an audible warning through two speakers 86 in the form of a verbal warning, "Emergency, Emergency", for a selected time period, for example, one minute. If on one come within the selected time period to unlock the vehicle and manually activate one or more controls of the vehicle, the control assembly is further activated. If the control assembly 80 determines that after one minute, on one has responded and made manual adjustments, the control assembly will send an electric signal to the ignition 79 to trigger the ignition to start the automobile 70 in which the temperature sensor detects that it is dangerously hot or cold. If the vehicle is parked in a "silent zone", for example near a hospital, the system may include muting devices 183 for the horn, 185 for voice box and 186 for the speakers. The muting devices may be activated remotely by security personnel and will moderate the audible warnings but will not affect the visual warnings provided by the lights 84, 87 and 88 of the vehicle.

The temperature sensor 81 activates the control assembly 80 to turn on the heater switch 95 or the air conditioner switch 91, depending upon whether the car is dangerously cold or dangerously hot. If the temperature remains dangerously hot for another selected period, the system sends an electric signal to the window controls 94 that will activate the power windows to open the windows.

When the control assembly 80 and 96 has started the engine to ensure activation of the heater or the air conditioner, if the battery 89a indicates a loss of power output, the control assembly will signal the switches 91 and 95 to turn off the air conditioner or heater if they are running. If the power supplied by the battery 89a remains low, the control assembly will also trigger a signal to turn off the automobile 70 if there is no key 79a in the ignition 79. The control assembly 80 has a reserved power back-up unit 96 that can be charged by the generator 101 of the car's electrical system. The reserved power back-up unit 96 is effective when the automobile's battery 89a is providing too little power to activate the engine and the car's air conditioner 91a and heater 95. In such case, the reserved power unit 96 will operate the horn 83, the lights 84, 87 and 88 and the voice box 85 through the speakers 86 for a few hours, without attempting to start the engine.

Preferably, the system includes a key chain wireless transmitter 100 having an ignition state detector 98 with a reset button. When the automobile is equipped with a monitored navigation system, the control assembly may include an automatic dialer 102 which may make outgoing calls over the internet to telephone numbers programmed into the dialer. The message is preferably the message generated by the voice box 85 and the dialer may be set to send the message to the navigation system so that the individual monitoring the system will receive the message and may notify security or the emergency number for the area identified by the automatic navigation system. The automatic dialer may also be programmed with the cell phone number of the driver so that the driver will be able to receive the message that is being transmitted from the voice box 85. The wireless device 101 and automatic dialer 102 may also be provided when the system is preset as a theft-prevention system.

As noted previously, motion detectors have been provided as theft-prevention devices. The present system may incorporate such devices as a supplement or a replacement for the motion detectors 82a and 82b. When in the theft-prevention mode, any attempt to move the locked vehicle while parked will activate the system and provide visual and audible warnings, and if the system is equipped with an automatic dialer 102, the voice box 85 may send a message to the monitor of the navigation system and/or the cell phone number which has been programmed into the system.

The invention claimed is:

1. A motion-activated response system for an automobile having at least one audible warning device, at least one warning light, a heater, an air condition, and an engine operable to activate side heater and air conditioner, side system comprising a motion detector operable to detect motion in the automobile to create a motion signal, a temperature sensor operable to detect dangerous temperatures within the automobile and create a dangerous temperature signal, a heat switch for activating the heater, an air-conditioner switch for activating the air conditioner, means for creating an audible warning, means for creating a visible warning, and a control assembly operable to receive said motion signal and activate said means for creating an audible warning message and said means for creating a visible warning.

2. A motion-activated response system for an automobile according to the previous claim wherein said temperature sensor creates a low temperature signal when the temperature within the automobile is dangerously low, and wherein further said control assembly activates said heater switch in response to said low temperature signal.

3. A motion-activated response system for an automobile according to any previous claim wherein said temperature sensor creates a high temperature signal when the temperature within the automobile is dangerously high, and wherein further said control assembly activates said air-conditioner switch in response to said high temperature signal.

4. A motion-activated response system for an automobile having an engine and an ignition switch for remotely starting and stopping the engine according to claim 2 or 3, wherein said control assembly operates said ignition switch to start the engine in response to said temperature signal.

5. A motion-activated response system for an automobile having a horn as an audible warning device according to any previous claim, wherein said means for creating an audible warning includes voice box and speakers for generating an audible announcement, and means for activating the automobile's horn.

6. A motion-activated response system for an automobile having flashing warning head lights and back lights according to any previous claim wherein said means for creating a visible warning includes means for activating the flashing warning lights.

7. A motion-activated response system for an automobile having a monitored navigation system according to any of claims 5 and 6, including an automatic dialer which can be programmed to transmit said audible announcement to the monitor of the navigation system and to any cell phone number programmed into the dialer, said control assembly operating said dialer to transmit the warning message when said motion signal is received.

8. A motion-activated response system for an automobile having a main battery connected to said control assembly and a generator according to any of claims 2-7, including a reserve power unit having a reserve battery for operating the control assembly when the main battery has a reduced charge, said generator charging the main battery and the reserve battery when the automobile is driven, said control assembly operating to disconnect said main battery when it has a reduced charge, and to simultaneously inactivate said temperature signal.

* * * * *